United States Patent [19]

Dobberpuhl et al.

[11] Patent Number: 4,838,101
[45] Date of Patent: Jun. 13, 1989

[54] POWER TAKE-OFF SHAFT STABILIZER UNIT

[75] Inventors: Dale R. Dobberpuhl; Edward C. Kruel, both of Horicon, Wis.

[73] Assignee: Deere & Company, Moline, Ill.

[21] Appl. No.: 91,699

[22] Filed: Sep. 1, 1987

[51] Int. Cl.⁴ .................................................. F16H 37/00
[52] U.S. Cl. ........................................ 74/15.63; 474/117; 474/136
[58] Field of Search ............... 74/15.63, 15.8, 15.82, 74/15.84; 180/53.1; 474/136, 117, 115, 114, 109

[56] References Cited

U.S. PATENT DOCUMENTS

| 286,906 | 10/1883 | Clarke | 74/15.82 |
| 1,772,247 | 8/1930 | Forrester et al. | 74/15.84 |
| 2,450,080 | 9/1948 | Burrell et al. | 74/15.63 |
| 2,624,416 | 1/1953 | Larsen | 180/53.1 |
| 3,033,302 | 5/1962 | Ball | 180/53.5 |
| 3,828,878 | 8/1974 | Clapsaddle | 74/15.63 |
| 4,241,614 | 12/1980 | Gould et al. | 74/15.63 |
| 4,640,378 | 2/1987 | Dobberpuhl et al. | 180/53.1 |

FOREIGN PATENT DOCUMENTS 555430  3/1923  France ............................... 74/15.84

Primary Examiner—Leslie A. Braun
Assistant Examiner—Janice E. Chartoff

[57] ABSTRACT

A power take-off shaft stabilizer unit for maintaining a relatively constant distance between an engine crankshaft and a PTO shaft has a bracket attached to the engine. The bracket receives a bearing unit comprising a casting having a bearing seat or a bearing mounted therein and a plurality of taps formed in the casting. The bearing unit receives the PTO shaft. At least three studs are connected to the casting via taps formed therein. The studs are utilized to connect the bearing unit to the bracket through a plurality of holes formed in the bracket. A first spring loaded bracket arrangement for maintaining an approximately constant belt tension between the engine output shaft and the PTO shaft during rotation thereof is operatively connected to the bearing unit via the two studs. A second spring loaded bracket arrangement for maintaining the position of the PTO shaft relative to the bracket approximately constant is operatively connected to the bearing unit via the other stud. With the location of the stabilizer unit and the construction thereof, the belts utilized to selectively transmit the rotation of the crankshaft to the PTO shaft can be easily changed by an operator.

10 Claims, 3 Drawing Sheets

POWER TAKE-OFF SHAFT STABILIZER UNIT

BACKGROUND OF THE INVENTION

The present invention relates to a power take-off (PTO) mounting arrangement and, more particularly, to a power take-off shaft stabilizer unit.

Because of superior operator visibility, maneuverability and relative stability, vehicles having front mounted (FM) mowers have become increasingly popular for lawn care operations. The front mount mower is conventionally configured a a front wheel drive, rear wheel steer vehicle which includes a front hitch for the attachment of implements, such as a mower deck or snowblower. With this configuration, in order to deliver power to the attached implement, it is known to equip the front mount vehicle with a PTO system for selectively communicating between the engine and the front mounted implement.

Because a front mounted vehicle has a relatively short length and low ground clearance, many conventional PTO systems are ill-suited for the incorporation therein. Further, the use of diesel and other engines which exhibit a high torque displacement and vibration cause problems which must be considered when selecting a suitable PTO system. Diesel and similar engines, due to the higher torque displacement and vibration require that allowances be made for the vibration between the engine crankshaft and the PTO shaft. Specifically, the belts conventionally utilized to transfer power from the engine to the PTO, in order to operate efficiently and to achieve long life, must maintain a certain tension between the pulleys on the engine crankshaft and the PTO shaft. Additionally, if the PTO shaft is positioned by a bracket attached to the engine rather than mounted on the vehicle frame, accommodation must be made for maintaining a relatively constant position between the PTO shaft relative to the bracket.

As with all PTO systems, substantial counterloading of the engine crankshaft or crankshaft bearings, which could precipitate engine crankshaft misalignment or premature cam shaft bearing failure, must be avoided. It is known that a PTO system driven off the crankshaft from an engine torque shaft may produce a counter resistance to engine torque deflection where the PTO system is hard mounted to the vehicle frame and is driven from the torque shaft from a fixed length medium such as a continuous belt. The counter resistance caused by the belt during engine torque displacement imparts a crankshaft torque about the crankshaft bearing which may result in engine misalignment.

It is equally important that the PTO system not unduly load the torque shaft between the engine and the transaxle when the PTO shaft is connected to the engine crankshaft at the location between the engine crankshaft and the transaxle.

One prior solution to the above problems encountered when mounting the PTO shaft to the engine and connecting the engine drive shaft and the PTO shaft at a position between the engine and the transaxle when the PTO shaft is mounted to the engine frame is disclosed in U.S. Pat. No. 4,640,378 issued Feb. 3, 1987 and commonly owned with the present application. In that patent, a key was provided in a slot of the bearing quill, however, the various components required high dimensional accurancy, because if they were to be loosely fit, vibration from the belts would cause considerable noise and wear. With wear, the noise increases, thus, this particular solution proved unacceptable when the high dimensional accuracy was not maintained.

An additional problem encountered with the above mentioned patent was that of changing belts. With the structure disclosed in the above patent, it was necessary to disassemble the engine crankshaft in order to remove the old belts and replace them with new belts. This complicated, time consuming, operation proved unacceptable to commercial users of FM vehicles.

Thus, there is a need for a power take-off shaft stabilizer unit which insures that the proper belt tension be constantly maintained between the engine crankshaft and the PTO shaft; which provides for rapid disassembly and replacement of worn belts with new belts; and, which eliminate the excessive noise and other problems associated with the prior systems.

SUMMARY OF THE INVENTION

The present invention is a power take-off shaft stabilizer unit for mounting a power take-off shaft to an engine mounted on a vehicle frame. The stabilizer unit comprises a bracket having elongated holes formed therein and at least two flanges attached thereto, each of the flanges having at least one hole formed therein, for attaching the unit to the engine, a bearing unit comprising a casting bearing mounted in a bearing seat and a plurality of taps formed therein, at least three studs for connecting the bracket to the bearing unit, a pulley attached to one end of the PTO shaft for communicating with the engine output shaft such that the power take-off shaft is rotated when the engine output shaft is rotated, means attached to the bracket and the bearing unit for maintaining a constant distance between the engine output shaft and the PTO shaft during the selected rotation thereof, and means for maintaining the relative position of the shaft to the bracket.

A further aspect of the present invention includes the assembling of two of the three studs to the casting in two taps and assembling the bearing unit to the bracket through the holes of one of the bracket flanges. The two studs are positioned in the taps on each side of the casting perpendicular to the PTO shaft and parallel to a line connecting the PTO shaft to the engine output shaft. The third stud is assembled to the bearing unit via the other tap. The third stud is then assembled through an elongated hole in the second of the bracket flanges, perpendicular to both the PTO shaft and the line connecting the PTO shaft with the engine output shaft.

The tension on the belts is achieved by an alignment member having a pair of holes formed therein which correspond to the pair of holes in one of the bracket flanges, the alignment member has a rectangular member thereto perpendicular to the plane of the alignment member for indicating when proper belt tension has been achieved.

In order to maintain the constant tension on the belts, a pair of spring members are assembled over the two studs and contact one surface of the alignment member. Means are operatively connected to the studs for adjusting each spring member thereon such that the distance between the PTO shaft and the engine output shaft remains approximately constant.

An important feature of the present invention includes a pair of rectangular members each having a hole formed therein, positioned on both sides of the second flange and having the third stud inserted therethrough. A third spring member is mounted on the third stud and contacts the surface of one of the rectangular members. Means for adjusting the spring on the stud such that the tension on the bearing unit remains constant as the PTO shaft moves in response to the movement of engine output shaft is also provided.

Finally, a method for quickly changing the belts connecting the engine shaft and the PTO shaft, if they should become worn or for other reasons, is greatly facilitated by the location of the power take-off shaft stabilizer unit at the rear of the front mounted implement vehicle so that it is merely a matter of disconnecting an electrical connection, releasing the tension on the rotor, releasing the tension on the spring members on the studs, removing the belts, replacing the belts, retensioning the spring mounted members to the proper tension, refastening the rotors, and reconnecting the electrical connection.

The primary object of this invention, therefore, is to provide a power take-off shaft stabilizing unit which maintains constant tension between the engine crankshaft and the PTO shaft when the stabilizing unit is mounted to the engine; which provides optimum adjustment of the tension between the PTO shaft of the belts mounted between the PTO shaft and the engine crankshaft; which provides for acceptable location on the PTO shaft relative to the stabilizer unit bracket at all times; and which provides for the rapid belt change should the belts become worn or broken.

Other objects and advantages of the present invention will be apparent from the following description, accompanying drawings and the appended claims.

DESCRIPTION OF A PREFERRED EMBODIMENT

Figure 1:
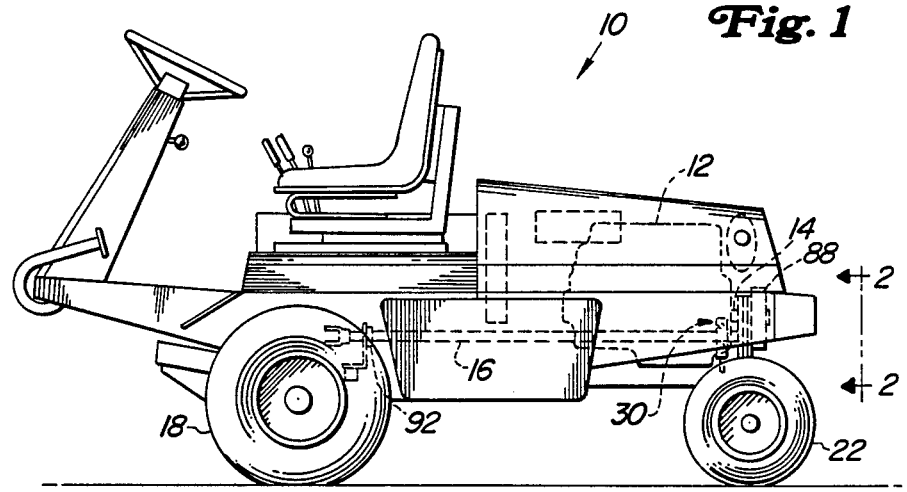
FIG. 1 is side elevated view of a front mount vehicle incorporating the present invention.

A preferred embodiment of the present invention is illustrated by way of example in FIGS. 1-4. With specific reference to FIG. 1, a vehicle 10 for mounting implements on the front thereof conventionally referred to as a front mount mower includes an engine 12, shown in phantom, an engine crankshaft 14, and a PTO shaft 16. The vehicle 10 is conventionally driven by front wheels 18 and steered by rear wheels 22. It should be understood that the present invention could be utilized with vehicles other than the front mount mower vehicle 10 illustrated.

Figure 4:
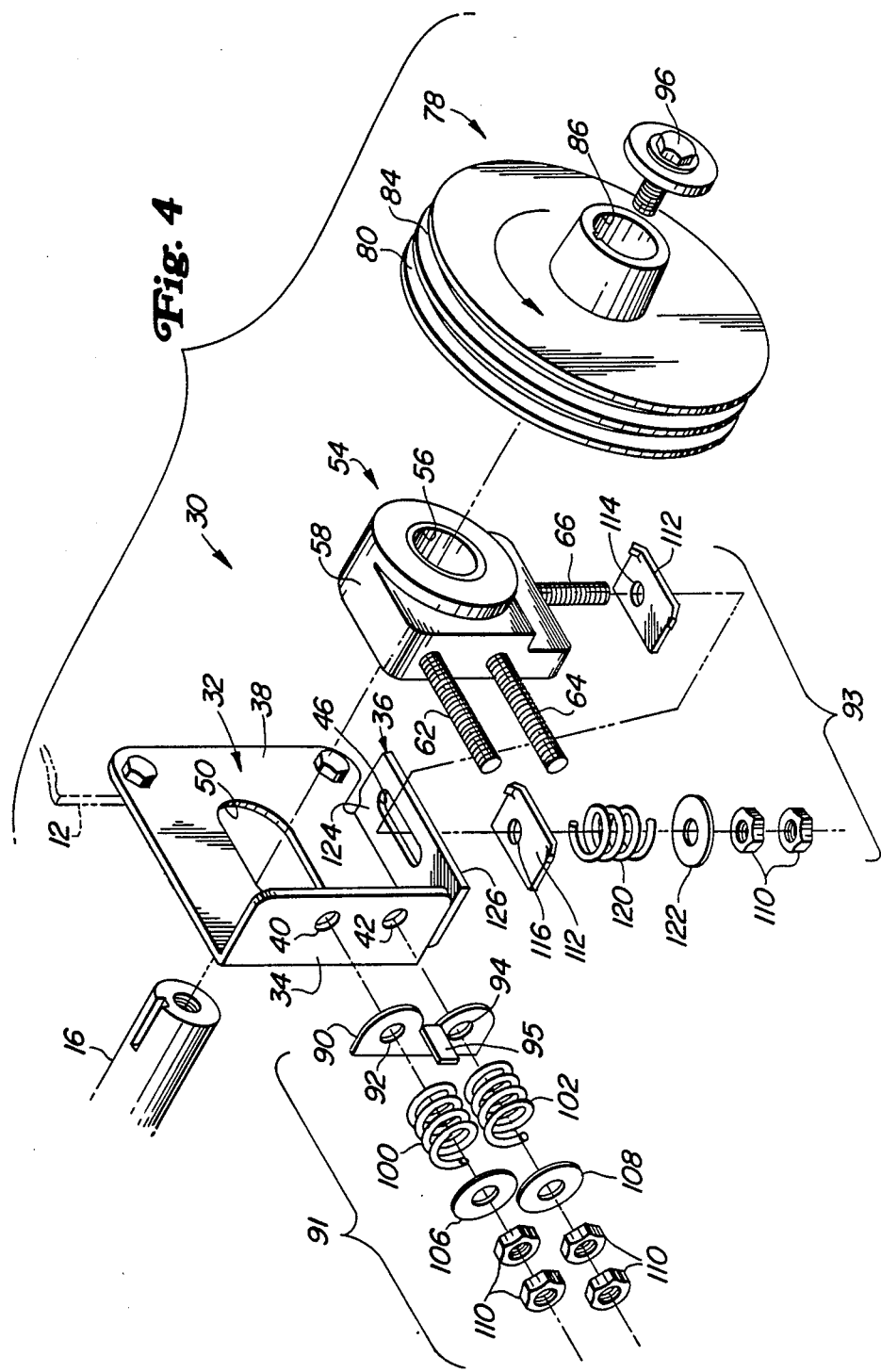
FIG. 4 is an exploded view of the power take-off shaft stabilizer unit of the present invention.

As shown particularly in FIG. 4, a power take-off shaft stabilizer unit 30 includes a stabilizer unit connection means or bracket 32 conventionally mounted to the engine 12. The bracket 32 has a pair of flanges 34, 36 each oriented at approximately 90° angles to the bracket surface 38. The first flange 34 has a pair of apertures 40, 42 formed therein for purposes which will be explained later. The second bracket 36 has an elongated hole 46 formed therein, likewise for purposes which will be explained later. The two flanges 34, 36 are preferably attached perpendicular to the bracket surface 38 and perpendicular to each other. The bracket 32 has an elongated hole 50 formed therein, which is elongated in the same direction as the elongated hole 46, for receiving the PTO shaft 16.

A bearing unit 54 includes a bearing 56 mounted in a casing 58. The bearing 56 receives the PTO shaft 16 after the shaft has been inserted through the elongated hole 50. Three stud members 62, 64, 66 are conventionally attached to the casting 58, preferably by taps, perpendicular to the PTO shaft 16. Two stud members 62, 64 are positioned in the casting so as to engage apertures 40, 42 of first flange 34. The third stud 66 is positioned in casting 58 so that it will fit the elongated hole 46 of second flange 36. The two studs 62, 64 are positioned in the casting perpendicular to the third stud 66.

A pulley member 78, having means 80, 84 for receiving two belts 81, 85 also receives PTO shaft 16 through aperture 86. The PTO shaft stabilizer construction is conventionally secured to the PTO shaft 16, for example by bolt 96.

As shown in FIG. 1, the forward end of the PTO shaft is mounted in a spherical bearing 92. The spherical bearing 92 is so designed that it provides a 2° plus or minus variance from its nominal position.

Figure 2:
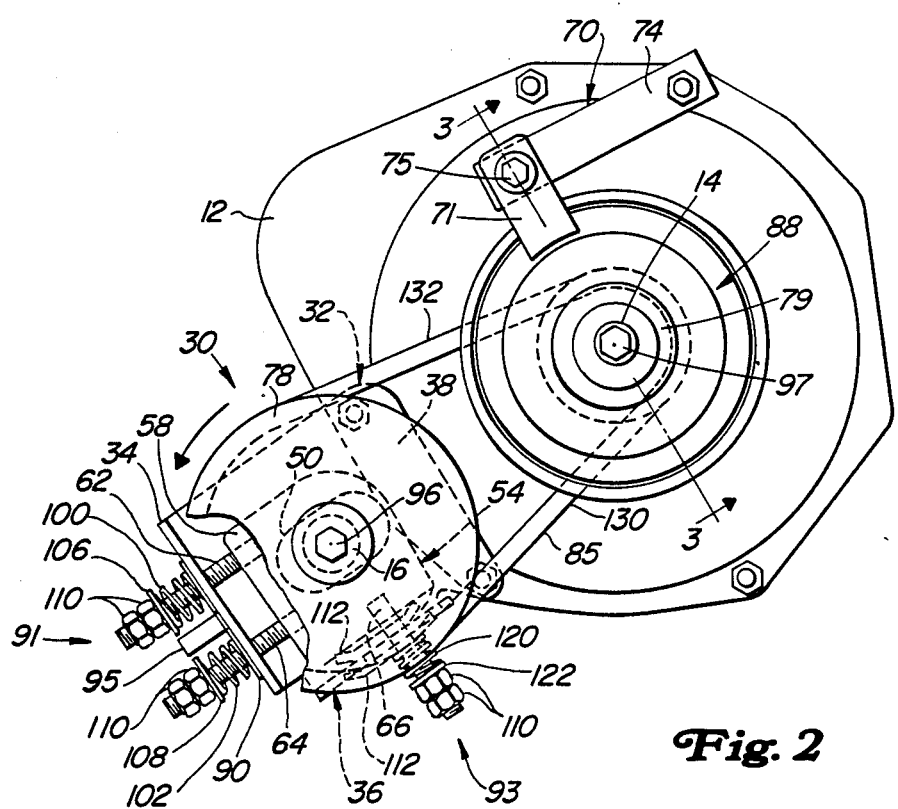
FIG. 2 is a partial side sectioned view of the vehicle illustrating the relationship between the PTO shaft stabilizer unit of the present invention to the engine and engine crankshaft along line 2—2 of FIG. 1.
Figure 3:
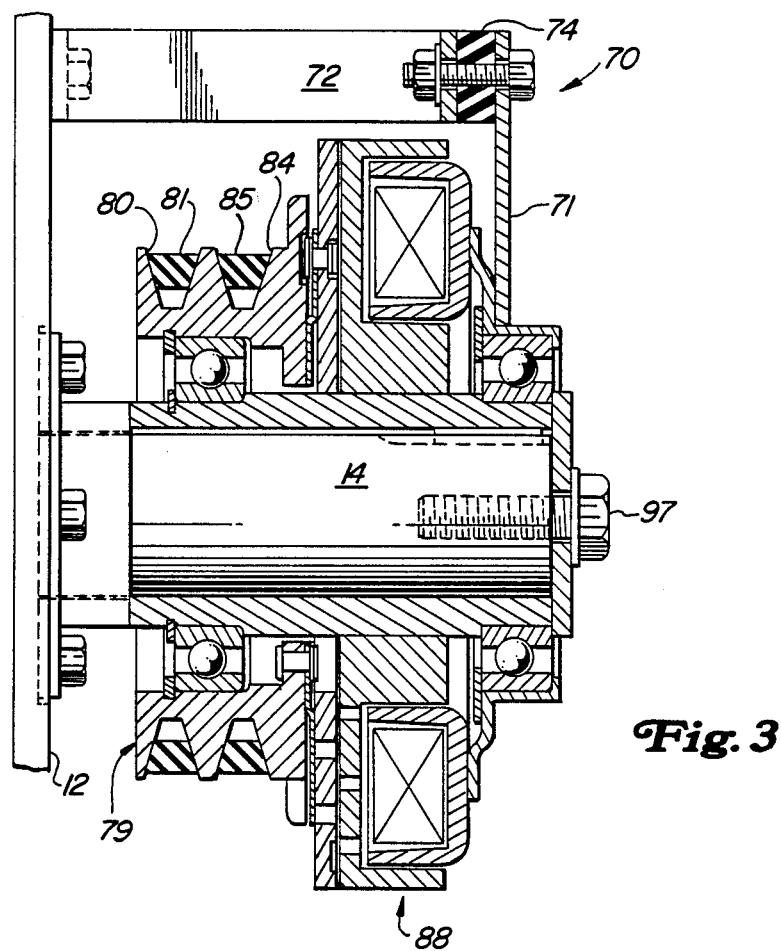
FIG. 3 is a partial sectioned view along line 3—3 of FIG. 2.

As shown in FIGS. 1-3, a PTO clutch 88 is mounted at the remote end of the engine crankshaft 14. The clutch 88 is conventionally secured to the engine crankshaft 14, preferably by a screw 97. It should be understood that both the PTO shaft stabilizer unit 30 and clutch 88 could be secured to their respective shafts 16, 14 by other conventional means such as clips, etc.

The electrical clutch 88 is conventionally connected to the vehicle electrical system. Also, the clutch is connected to the engine by a connecting means or bracket assembly 70. The bracket assembly 70 comprises a first rigid portion 71 operatively connected to the clutch 88, a second rigid portion 72 operatively connected to the engine 12 and an elastomeric portion 74 interconnecting the two rigid portions 71, 72. The portion 74 connecting the two rigid portions 71, 72 is preferably made of an elastomeric material to compensate for the vibration caused by the engine 12 between the engine 12 and the clutch 88.

With specific reference to FIGS. 2 and 4, means 91 for maintaining a constant relationship between the engine crankshaft and the PTO shaft or for maintaining the proper optimum belt tension between the engine crank shaft and the PTO shaft and means 93 for maintaining the PTO shaft in a common reference with the bracket 32 or for maintaining the proper alignment between the bracket and the shaft is illustrated as including three springs 100, 102, 120 attached to the three studs 62, 64, 66, respectively.

The means 91 for adjusting the proper optimum belt tension between the engine crankshaft 14 and the PTO shaft 16 includes a pair of springs 100, 102 mounted on the two studs 62, 64. In the preferred embodiment for the particular application, the spring coefficient was selected by a computer so that the optimum belt tension would be maintained so that belt life would be maximized. The studs 62, 64 are inserted through apertures 40, 42 respectfully of first flange 34. A tab 90 having apertures 92 and 94 formed therein and a height gauge 95 formed perpendicular to the plane of the tab 90. Then, the tab 90 is fitted over the studs 62, 64 with the springs 100, 102 being placed on the studs 62, 64 contacting the tab 90. The springs 100, 102 are secured in place by washers 106, 108 and a plurality of nuts 110, respectively.

The means 93 for maintaining the proper alignment between the bracket 32 and the shaft 16 includes a pair of plates 112, preferably identical, each having apertures 114, 116 formed therein, the third spring 120, a washer 122 and two more nuts 110. The stud 66 is inserted through the aperture 114 of plate 112 and then through the aperture 46 of flange 36 such that the plate is between the casting 58 and the flange surface 124. The second plate 112 is then assembled over stud 66 through aperture 116 such that the surface 126 of flange 36 is contacted thereby. The spring 120 is then assembled onto the stud 66, the washer 122 and the nuts 110 are then adjusted to obtain the optimum position.

The location of the stud 66 within the elongated slot 46 is determined by the length of the belts or the wear of the belts so that the studs 66 positioned therein changes with the operation of the shaft stabilizer unit 30 over time as well as with tolerance buildup within the unit. During operation, the bearing 56 needs to relocate and that will in turn relocate the stud 66 within the elongated slot 46. Without the plates 112, located on both surfaces 124, 126 of the flange 36, the spring 120 would tend to get caught in the elongated slot 46. Since the apertures 114 and 116 in plates 112 are smaller than the elongated slot 46, the plates 112 covers the normally exposed portion of the elongated slot 46 and thus provides a bearing surface for the spring 120 to abut. This allows the plates 112 to slide along flange 36 without the spring 120 being caught in slot 46 and permitting the relocation of stud 66 with the slot 46 as necessary. The other plate 112 located on the surface 124 between the surface 124 and the casting 58 provides a bearing surface contact for the sliding action so that the casting 58 will slide smoothly along the elongated slot 46.

The bearing unit 54 is assembled to the bracket 32 by inserting studs 62 and 64 through apertures 40, 42 respectively and stud 66 through aperture 114 of plate 112 and then through elongated slot 46 of flange 36. Once the bearing unit 54 is so installed into the bracket 32, the tab 90 having the height gauge 95 is then assembled over the studs 62, 64 through apertures 92, 94 respectively. A pair of springs 100, 102 are inserted over the studs 62, 64. The springs 100, 102 are held in place by washers 106, 108 and nuts 110. The shaft 16 is inserted through the elongated slot 50 through the bearing unit 54 and pulley 78 having belts 81, 85 mounted thereon and is secured in place by bolt 96.

To assemble the PTO shaft 16 to vehicle 10 utilizing the PTO shaft stabilizer unit 30, the PTO shaft 16 is mounted in the spherical bearing 92 at the front end of the vehicle. The power take-off shaft stabilizing unit 30 is assembled and the PTO shaft is inserted through the bearing 56. The bracket 32 is attached to the engine 12.

The stud 66 receives a second plate 112 through aperture 116, a spring 120, washer 122, and a pair of nuts 110. The shaft 16 is inserted through the elongated slot 50 through the bearing unit 54 and pulley 78 having belts 81, 85 mounted thereon and are secured in place by bolt 96.

The double springs 100, 102 which are parallel to each other maintain belt tension on belts 81, 85 between the centers of the two shafts 16 and 14. Since the shafts 14, 16 turn counterclockwise, the lower side 130 of the belts as seen in FIG. 2, sees tension and the upper side 132 is relatively slack. Since the lower side 130 has a higher tension than the upper side 132, tension will essentially be pushing the PTO shaft in a direction opposite the single stud 66. Thus, a countering force must be applied to stabilize the shaft 16 relative the bracket 32. At this point it should be understood that single stud 66 could be located 180° from its illustrated location, however, due to the space constraints in the present vehicle 10, the illustrated location was the only possible one which would allow the means 93 to accomplish its purpose.

As stated above, belt tension is compensated for by means 91 which include studs 62, 64, springs 100, 102 adjusted to height gauge 95. Compensation for the difference in engine vibration to maintain the bearing unit 54 relative the bracket 32 is compensated for by means 93 which include stud 66, two plates 112, spring 120 and the associated adjusting members.

Thus, it should be clear from the above to those skilled in the art that the result of this particular construction is the maintenance of constant belt tension between the engine crankshaft 14 and the PTO shaft 16 regardless of the engine vibration and the compensation for the difference in belt length.

An important feature of the present invention is the ability to change belts in a very short period of time. To accomplish this, the electrical system (not shown) to the clutch 88 must first be disconnected, the screw 97 removed from the shaft 14, the bracket assembly 70 is disconnected by removing the connecting bolt 75 which connects a portion 71 to portion 74. The tension of the belts 81, 85 are released, the belts are then disassembled from the pulley 78, taken off after the clutch 88, new belts are then installed over the end of the clutch 88 and pulley 78 and positioned thereon, belt tension is then properly adjusted, the bracket assembly for connecting the clutch 88 to the engine 12 is reconnected, the screw 97 is reinserted and the electrical connector is reconnected. At this point, a total of no more than 15 minutes for a mechanically inclined-person should have elapsed for the belt change to have been completed.

While the method herein described and the form of apparatus for carrying this method into effect constitutes preferred embodiments of the invention, it is to be understood that the invention is not limited to this precise method and form of apparatus and changes be made either without departing from the scope of the invention, which is defined in the appended claims.

What is claimed is:

1. A power take-off shaft stabilizer unit for stabilizing the position of a power take-off shaft relative to an output shaft of an engine and for tensioning a belt carried between them, said stabilizer unit comprising:

means for operatively connecting said stabilizer unit directly to said engine, said connecting means including a first flange with at least one hole therein and a second flange with a slot formed therein;

bearing means operatively associated with said connecting means for allowing rotation of said power take-off shaft;

first means operatively connected to said bearing means and registrable with the hole of the first flange for maintaining an approximately constant belt tension between the belt of said engine output shaft and said power take-off shaft; and second means operatively connected to said bearing means and registrable with the slot in the second flange for maintaining the relative positions of said power take-off shaft and said connecting means.

2. The stabilizer unit of claim 1 wherein the flange of the first maintaining means has two small apertures formed therein.

3. The stabilizer unit of claim 1 wherein said bearing means further comprises:
   a bearing unit including a casting; and
   a bearing member operatively positioned in said casting.

4. The stabilizer unit of claim 3 wherein said bearing unit further includes:
   at least two studs operatively attached to said casting.

5. The shaft stabilizer unit of claim 1 wherein said first maintaining means further includes:
   a tab having a height gauge operatively associated with said bearing means;
   spring means operatively associated with said bearing means and said connecting means; and
   adjusting means operatively associated with said bearing means and said connecting means for adjusting said power take-off shaft relative said engine output shaft.

6. A power take-off shaft stabilizer unit for mounting a power take-off shaft to an engine having an output shaft, said stabilizer unit comprising:
   a bracket, directly operatively connected to said engine, said bracket having an elongated hole formed therein for receiving the power take-off shaft and at least two flanges, one flange having at least one hole formed therein, and a second flange having a slot formed therein;
   a bearing unit operatively associated with said bracket for receiving said power take-off shaft;
   means operatively connected to said power take-off shaft for communicating with said engine output shaft such that said power take-off shaft is selectively rotated by said engine output shaft;
   first means operatively connected to said bearing unit and registrable with the hole of said flange for maintaining an approximate constant belt tension between said engine output shaft and said power take-off shaft during the rotation thereof; and
   second means operatively connected to said bearing unit and registrable with said slot for maintaining the positions of said power take-off shaft relative to said bracket.

7. A PTO shaft stabilizer unit of claim 6 wherein the communicating means further comprises:
   at least one pulley operatively connected to said PTO shaft;
   at least one pulley operatively connected to said engine output shaft; and
   belt means operatively positioned in each of said pulleys, for selectively transmitting torque developed by said engine output shaft to said PTO shaft.

8. A method for changing a belt utilized to transmit power from an engine crankshaft to a power take-off shaft which is carried offset from the crankshaft, said method comprising the steps of:
   releasing a first means securing the position of the power take-off shaft relative to the crankshaft;
   releasing a second means securing the tension between said belt connecting said power take-off and said engine shaft;
   moving the power take-off shaft towards the engine crankshaft;
   removing the belt connecting the two shafts;
   installing a replacement belt between said two shafts,
   moving the power take-off shaft away from the engine crankshaft;
   securing the first and second means to reposition the two shafts and re-establish tension on the belt.

9. A power take-off shaft stabilizer unit for mounting a power take-off shaft to an engine having an output shaft, said stabilizer unit comprising:
   a bracket directly operatively connected to said engine, having an elongated hole formed therein and at least two flanges, each having at least one hole formed therein;
   a bearing unit including a casting;
   a bearing member operatively positioned in said casting;
   at least two studs operatively connected to said casting;
   at least an additional stud operatively attached to said casting perpendicular to said two studs;
   at least one pulley operatively connected to said power take-off shaft;
   at least one pulley operatively connected to said engine output shaft;
   belt means operatively positioned in each of said pulleys for selectively transmitting torque developed by said engine output shaft to said power take-off shaft;
   a tab having a height gauge positioned on said two studs;
   spring means operatively positioned on said two studs and contacting said tab;
   first adjusting means, operatively connected to said two studs, for adjusting said power take-off shaft relative to said engine output shaft;
   second spring means operatively assembled over said one stud for maintaining the proper relationship between said stabilizer unit connecting means and said power take-off shaft; and
   second adjusting means operatively associated with said one stud for adjusting said second spring means so that proper alignment is maintained between said bracket and said power take-off shaft.

10. A power take-off shaft stabilizer unit for a power take-off shaft carried offset from the output shaft of an engine, said stabilizer unit comprising:
    means for operatively connecting said stabilizer unit directly to said engine;
    bearing means operatively associated with said connecting means for allowing rotation of said power take-off shaft;
    first means operatively connected to said bearing means for maintaining an approximately constant belt tension on a belt connecting said engine output shaft and said power take-off shaft; and
    second means operatively connected to said bearing means for maintaining the relative positions of said power take-off shaft and said connecting means;
    said second means including:
      at least two bearing surfaces operatively associated with said bearing means and said connecting means;
      spring means operatively associated with said bearing means and said connecting means for maintaining the proper relationship between said connecting means and said power take-off shaft; and
      means operatively associated with said bearing means and said connecting means for adjusting said spring means.

* * * * *